United States Patent [19]
Tuli

[11] Patent Number: 5,389,946
[45] Date of Patent: Feb. 14, 1995

[54] APPARATUS AND METHOD FOR PRODUCING A VIEWSCREEN FROM A MINIATURE HIGH RESOLUTION CHIP

[76] Inventor: Raja S. Tuli, 55 City Centre Dr., Ste. 500, Mississauga, Ontario, Canada, L5B 1M3

[21] Appl. No.: 997,166
[22] Filed: Dec. 28, 1992
[51] Int. Cl.$^6$ ............................................. G09G 3/34
[52] U.S. Cl. ...................................... 345/106; 345/7; 359/43
[58] Field of Search .................. 340/786, 785, 719; 359/44, 43, 40; 358/236; 345/55, 106

[56] References Cited

U.S. PATENT DOCUMENTS

| | | | |
|---|---|---|---|
| 3,637,291 | 1/1972 | Kessler et al. | 359/44 |
| 3,877,008 | 4/1975 | Payne | 340/786 |
| 4,391,492 | 6/1983 | Lu et al. | 359/44 |
| 4,500,878 | 2/1985 | Hareng et al. | 340/786 |
| 5,034,809 | 7/1991 | Katoh | 358/236 |
| 5,150,138 | 9/1992 | Nakamishi et al. | 350/40 |

Primary Examiner—Alvin E. Oberley
Assistant Examiner—Steven J. Saras

[57] ABSTRACT

A miniature single monolithic chip is to be used to create a viewscreen for Computers, Television or Video applications. Magnifying this display would produce an inexpensive screen capable of being mounted on face goggles, or alternate stand alone apparatus. Using an optic system, the eye could perceive an image of various size screens. The chip being so close to the eye would require very little illumination. Advantages of this apparatus are numerous especially due to low power consumption and light weight. Ideally this would be suitable for portable lap top Computer and Video systems. Dual chips could also be used to produce true Three Dimensional images capable of large screen viewing.

1 Claim, 1 Drawing Sheet

APPARATUS AND METHOD FOR PRODUCING A VIEWSCREEN FROM A MINIATURE HIGH RESOLUTION CHIP

BACKGROUND OF THE INVENTION

This invention relates to an apparatus and a method for producing a display from a single miniature high resolution monolithic chip. In particular, the apparatus uses a chip with an array of heating elements in an orderly grid pattern with a custom die coating which changes color with temperature changes. Viewed through a lens system, this high resolution image could appear in sizes ranging from computer monitors to cinema screens.

Display screens of very high resolution have numerous applications, especially as size and cost decreases. This invention is ideally suited for a variety of portable applications.

SUMMARY OF THE INVENTION:

Generally speaking, in accordance with the present invention, a viewscreen of high speed and resolution is provided with the use of a single chip. The arrangement includes a lens system which magnifies an image produced by a custom chip. The chip and lens could all be mounted on face goggles or alternative apparatus enabling portability.

The heart of the invention lies with the custom chip, being the most critical component. This chip is composed of an array of heating elements which can each be individually addressed in a matrix fashion. A special thermochromic die or Liquid Crystal coating on this array would permit each "pixel" to undergo a temporary color change from black to white or other colors. By rapidly addressing this high density array with rapid color changes, it is possible to create a view screen capable of creating and displaying a moving monochrome picture. The human eye does not "see" moving objects, instead it sees a series of stationary images. As long as frames are displayed quickly enough to avoid significant flicker, you will see the effect of motion.

It is possible to convert this monochrome display to color by using a sequential color lighting technique, or by using a thermochromic die that can change to several colors with different temperatures.

BRIEF DESCRIPTION OF THE DRAWINGS

This invention may be better understood and its numerous objects and advantages will become apparent to those skilled in the art by reference to the accompanying drawings as follows.

DETAILED DESCRIPTION OF PREFERRED EMBODIMENTS

Figure 1:
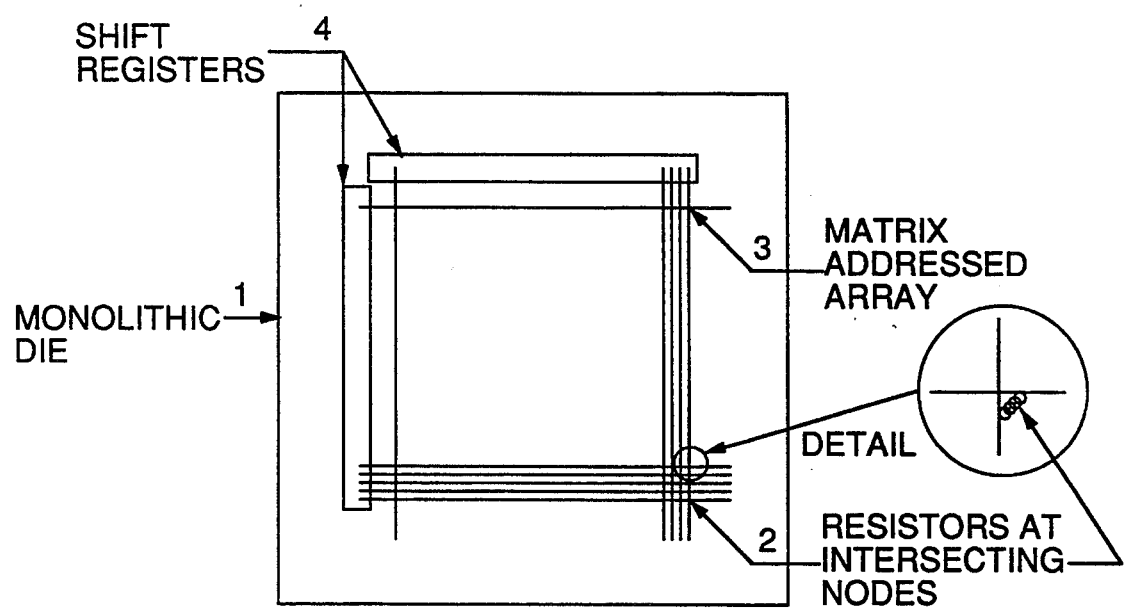
FIG. 1 is a diagrammatic view showing the basic layout and operations of the miniature high resolution viewscreen chip in accordance with the present invention.

Reference is first made to FIG. 1 which illustrates the basic layout of the apparatus in accordance with the invention. The monolithic die 1, is shown to consist of an array of heating elements or resistors 2. These resistors would be matrix addressed 3 by means of shift resistors 4. The entire surface of the chip would be coated with a thermochromic die or liquid crystal highly sensitive to temperature changes. The resistor elements heat up when addressed and the thermochromic coating would change color from black to white or other colors instantly. Upon rapid cooling the coating will revert to its original color instantly. Thermochromic materials change color instantly at a fixed predetermined temperature, and will remain so through a set range.

Having a high density of coated matrixed resistor elements would, in effect, create a high resolution monochrome display. By rapidly changing each display or "frame" it is possible to produce a moving display. This, however would require many frames per second to accomplish the effect of continuous motion successfully.

Figure 2:
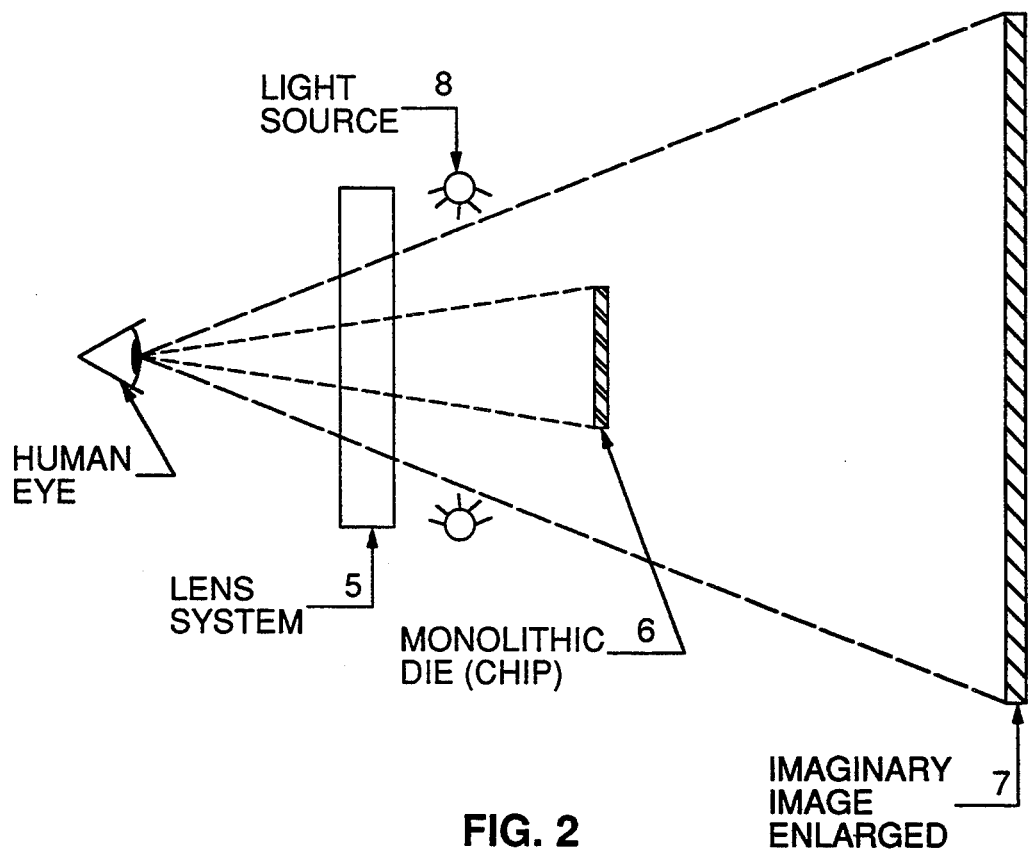
FIG. 2 is a diagrammatic view showing the principle optical design and image interpretation through a lens system as an embodiment of the present invention.

FIG. 2 gives a general idea as to the layout of the invention as described herein. A lens system 5 is implemented to magnify the image of the monolithic die 6, thus creating an imaginary image 7. A low powered light source 8 is required to illuminate the display and by using a sequential color lighting technique, it is possible to obtain a color display from monochrome. This method employs three primary colored LEDs or other light sources that alternately change the color of each frame. By having three times as many of these color enhanced frames as monochrome, a colored display is produced.

It is also understood that the following claims are intended to cover all of the general and specific features of the invention herein described, and all statements of the scope of the invention which, as a matter of language, might be said to fall therebetween.

I claim:

1. A visual display device, comprising:
    a monolithic, high density, high resolution visual display chip, integrated with an optical lens means to create an enlarged imaginary image,
    a layer of thermally sensitive material on said display chip which changes color due to a change in temperature,
    said thermally sensitive material comprising a thermochromic liquid crystal material which changes colors with a change in temperature,
    wherein a first color changes to a second color when said material is heated from a lower temperature to a higher temperature, the second color is maintained as long as said higher temperature is applied, said second color changes to said first color when said material is cooled from a higher temperature to a lower temperature,
    an array of heating elements positioned underneath said thermally sensitive layer forms a matrix array of pixels, individual heating elements being located at pixel location at the intersection of a plurality of row lines and column lines,
    said heating elements having a specific thermal mass which allows the elements to maintain said higher temperature for one frame period of the image, wherein the thermal mass acts like a memory for the frame period and maintaining said second color,
    means for establishing a current in selected ones of said thermal heating elements for raising the temperature level and altering the light reflecting properties of those portions of thermally sensitive materials which are in close proximity to said heating elements.

* * * * *